(12) United States Patent
Lukkarila

(10) Patent No.: US 8,606,321 B2
(45) Date of Patent: Dec. 10, 2013

(54) HIGH-SELECTIVITY LOW NOISE RECEIVER FRONT END

(75) Inventor: Teppo Lukkarila, Wallingford, CT (US)

(73) Assignee: Alcatel Lucent, Paris (FR)

( * ) Notice: Subject to any disclaimer, the term of this patent is extended or adjusted under 35 U.S.C. 154(b) by 228 days.

(21) Appl. No.: 12/659,854

(22) Filed: Mar. 24, 2010

(65) Prior Publication Data

US 2010/0261504 A1 Oct. 14, 2010

Related U.S. Application Data

(60) Provisional application No. 61/212,302, filed on Apr. 9, 2009.

(51) Int. Cl.
*H04B 1/10* (2006.01)
*H04W 88/08* (2009.01)

(52) U.S. Cl.
USPC ........... 455/561; 455/296; 455/306; 455/307; 455/127.3; 455/341

(58) Field of Classification Search
None
See application file for complete search history.

(56) References Cited

U.S. PATENT DOCUMENTS

| | | | | |
|---|---|---|---|---|
| 5,170,392 A | * | 12/1992 | Riordan | 370/252 |
| 5,655,375 A | * | 8/1997 | Ju | 62/3.6 |
| 6,212,404 B1 | | 4/2001 | Hershtig | |
| 6,711,394 B2 | * | 3/2004 | Abdelmonem | 455/307 |
| 6,876,843 B2 | * | 4/2005 | Madni et al. | 455/311 |
| 6,882,251 B2 | * | 4/2005 | Yu et al. | 333/202 |
| 2010/0035562 A1 | * | 2/2010 | Alberth et al. | 455/75 |
| 2011/0255434 A1 | * | 10/2011 | Ylitalo | 370/252 |

* cited by examiner

*Primary Examiner* — Yuwen Pan
*Assistant Examiner* — Fanghwa Wang
(74) *Attorney, Agent, or Firm* — Harness Dickey & Pierce

(57) ABSTRACT

Provided is a remote radio head receiver, including an antenna and an interference mitigation block. The antenna is configured to receive a signal. The interference mitigation block is configured to selectively pass and amplify the signal. The interference mitigation block does not include a liquefied gas cooling system.

15 Claims, 3 Drawing Sheets

HIGH-SELECTIVITY LOW NOISE RECEIVER FRONT END

PRIORITY STATEMENT

This application claims priority under 35 U.S.C. §119(e) to U.S. Provisional Patent Application No. 61/212,302, filed on Apr. 9, 2009, in the United States Patent and Trademark Office (U.S.P.T.O.), the entire contents of which is hereby incorporated herein by reference.

BACKGROUND OF THE INVENTION

1. Field

Embodiments relate to high selectivity, low noise front end receivers for a remote radio head receiver or a distributed base station receiver.

2. Description of the Related Art

Recently, the FCC has reallocated the 698-746 MHz (lower 700 MHz band) that had been allocated to television channels 52-59. Licensees of the lower 700 MHz band have a challenge to overcome before practical use of the lower 700 MHz band can be utilized. The surrounding frequency bands (e.g. 614-698 MHz and 716-722 MHz) are used by popular and emerging technologies (e.g., Digital Television and the MediaFLO Standard (FLO TV)).

FIG. 1 illustrates a typical distributed wireless base station system 100. As shown in FIG. 1, a base station receiver 110 is connected to a core network 105. Base station receivers 110 and core networks 105 are known in the art and will not be described for the sake of brevity. The base station receiver may receive a signal from, for example, a tower mount antenna 120, a rooftop antenna, and/or a wall mount antenna 130.

As is known in the art, the tower mount antenna 120, the rooftop antenna, and/or the wall mount antenna 130 may receive a signal from, for example, a mobile phone (not shown). In order to conserve power, signals transmitted by, for example, mobile phones are lower power signals. Unfortunately low power signals are susceptible to interference from other more powerful signals.

Under ideal conditions, any receiver will perform well. However, if site noise is not ideal, received signals are not strong and off-channel signals are strong, the selectivity of a receiver and the design of an amplifier become relatively important.

The lower 700 MHz band does not operate under ideal conditions. As described above, the lower 700 MHz band is at least susceptible to strong off-channel signals.

Referring again to FIG. 1. As shown in FIG. 1, the typical distributed wireless base station system 100 also includes an interference mitigation block 115. The interference mitigation block 115 is electrically between the receive antenna (e.g., tower mount antenna 120) and the base station receiver 110.

The interference mitigation block 115 selectively filters the off-channel signals (e.g., Digital Television channel 51 and the MediaFLO Standard (FLO TV)) and amplifies the signal received from the antenna. Typical requirements for the interference mitigation block 115 are, for example, shown in table 1 below.

TABLE 1

| Parameter | Specification |
|---|---|
| Rejection | 40 dB |
| Pass band | 698.3 MHz-715.7 MHz |
| Stop Band | 697.8-716.2 |
| Noise figure | ~1 dB over 80% of pass band |
| Linearity | High IP3 |

The only existing solution for an interference mitigation block to meet the above specifications is illustrated in FIG. 2. As shown in FIG. 2, the interference mitigation block 200 includes a cryogenic cooler 210, a cryogenically cooled enclosure 215, a high order, very high Q-factor RF Filter 220 and a very low noise figure amplifier 225.

The cryogenic cooler 210 in combination with the cryogenically cooled enclosure 215 keep the surroundings of the filter 215 and the low noise amplifier 225 to a temperature of less than 100K. By keeping the surroundings to less than 100K, the filter 215 and the low noise amplifier 225 achieve superconducting properties and thus are able to perform to the specifications listed in table 1, for example. Filter 220 may receive a signal from antenna 205 and selectively pass frequencies in the pass band of the interference mitigation block 200.

As one skilled in the art will appreciate, the drawbacks of the existing solution of using the interference mitigation block 200 as shown in FIG. 2 are numerous. Not the least of which is the cost of every system using cryogenics. Further, the system reliability of cryogenically cooled systems is limited. Two reliability limitations are, for example, DC power consumption, and "start up" time. If a power failure occurs, the cryogenically cooled system draws on batteries so the system may go down faster, and the cryogenically cooled system requires considerable time to start up again as it takes time to cool the system after the power comes back on. System reliability issues are critical today as people rely on wireless systems as their primary connection, including, for example, emergency situations.

Residents of these buildings may be leery of a building having a liquefied gas tank. Each of the cryogenic coolers 210 will require tank refills on a regular basis. Remote cryogenic coolers 210 will need to be monitored in some manner. The ongoing expense of using the interference mitigation block 200 as shown in FIG. 2 will continue to mount as more systems are put in use and as the lifetime of these systems increase.

Further, there are only a limited number of suppliers for such cryogenically cooled superconducting filters. Still further, the reliability of a cryogenically cooled filter is relatively low as is known based on typical mean time between failure calculations.

SUMMARY OF THE INVENTION

One example embodiment includes a remote radio head receiver, including an antenna and an interference mitigation block. The antenna is configured to receive a signal. The interference mitigation block is configured to selectively pass and amplify the signal. The interference mitigation block does not include a liquefied gas cooling system.

One example embodiment includes a remote radio head receiver including an antenna and an interference mitigation block. The antenna is configured to receive a signal. The interference mitigation block is configured to selectively pass and amplify the signal. The interference mitigation block includes a cooling system using ambient temperature air to dissipate heat generated by the interference mitigation block.

One example embodiment includes a distributed base station, including an antenna and a remote radio head. The antenna is configured to receive a signal. The remote radio head receiver includes an interference mitigation block configured to selectively pass and amplify the signal.

According to example embodiments, the interference mitigation block includes a first filter configured to receive the signal from the antenna, to pass signals in a first frequency band and to reject signals outside of the first frequency band. A first amplifier is configured to amplify an output signal of the first filter. The interference mitigation block includes a second filter configured to receive an output signal of the first amplifier, to pass signals in the first frequency band and to reject signals outside of the first frequency band. A second amplifier configured to amplify an output signal of the second filter.

The interference mitigation block passes signals associated with frequencies between 698.3 MHz and 715.7 MHz. The first filter passes signals with frequencies between 698.3 MHz and 715.7 MHz, rejects signals with frequencies below 698.3 MHz and rejects signals with frequencies above 715.7 MHz. The second filter passes signals with frequencies between 698.3 MHz and 715.7 MHz, rejects signals with frequencies below 698.3 MHz and rejects signals with frequencies above 715.7 MHz.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

Figure 1:
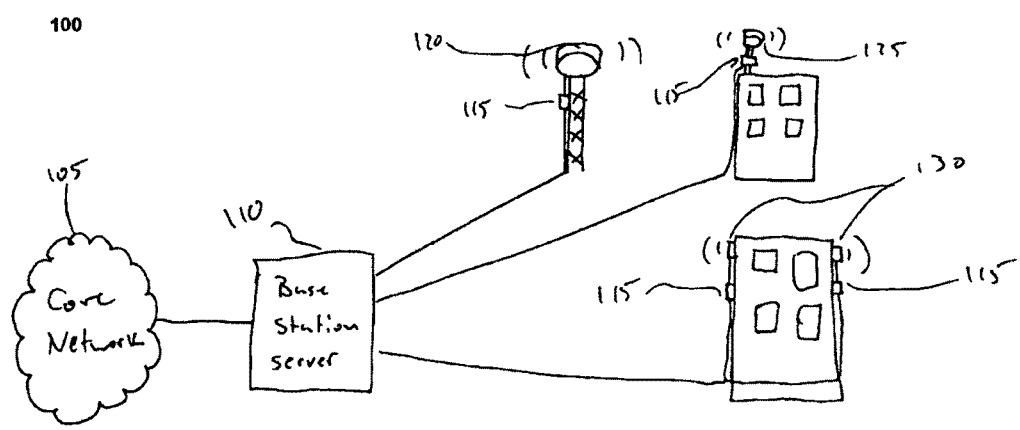
FIG. 1 illustrates a typical distributed wireless base station system.
Figure 2:
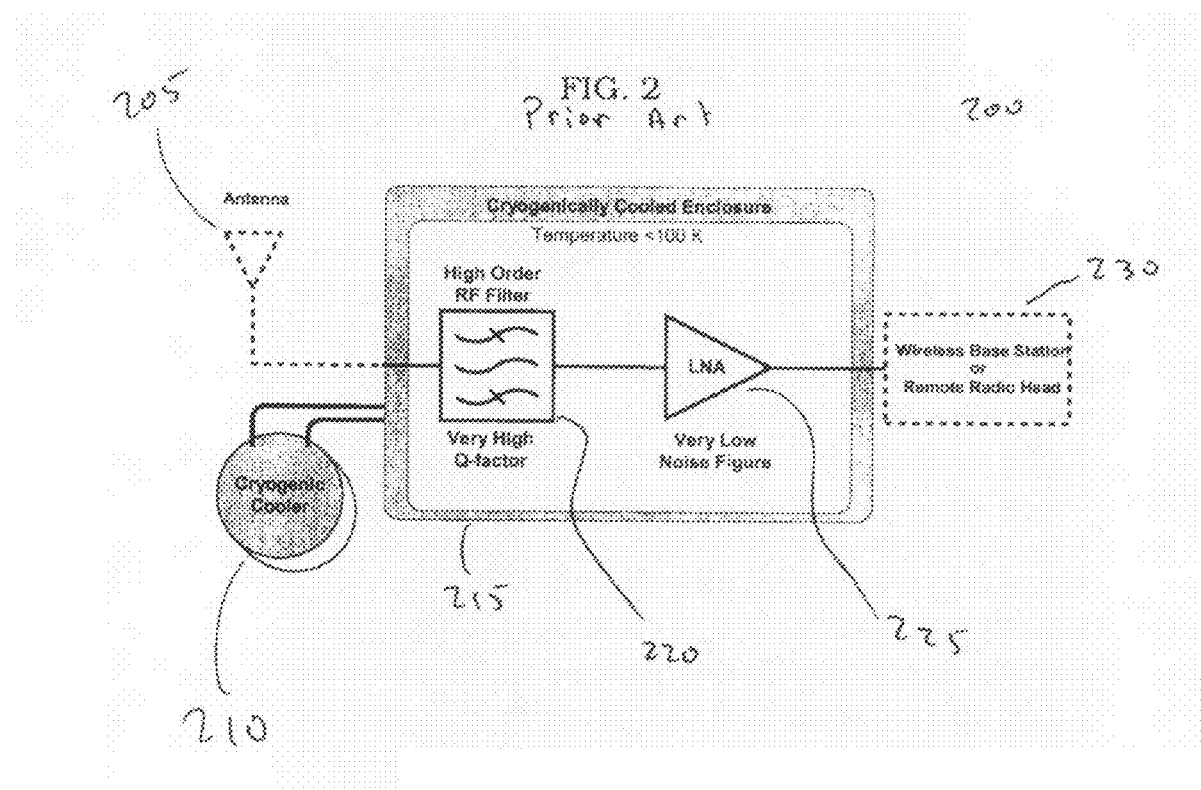
FIG. 2 illustrates a prior art interference mitigation block.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

As used herein, the term "user equipment" may be considered synonymous to, and may hereafter be occasionally referred to, as a mobile, mobile unit, mobile station, mobile user, subscriber, user, remote station, access terminal, receiver, etc., and may describe a remote user of wireless resources in a wireless communication network. The term "base station" may be considered synonymous to and/or referred to as a base transceiver station (BTS), NodeB, extended NodeB, evolved NodeB, femto cell, pico cell, access point, etc. and may describe equipment that provides the radio baseband functions for data and/or voice connectivity between a network and one or more users.

As discussed above, conventional technologies use a cryogenic cooling system to achieve the required performance characteristics of an interference mitigation block. Before this invention and for a considerable period of time, the only system that provided the needed performance characteristics used a cryogenic cooled interference mitigation block. As discussed above, the conventional art has several short falls, not the least of which is the cost over the lifetime of the system.

The inventor has developed a new system design using conventional technology achieving an unexpected, unpredicted result and satisfying a long felt need. One skilled in the art would not expect using the below described device to achieve performance characteristics comparable to a cryogenically cooled filter and amplifier. This is so because the performance characteristics of the prior art is achieved only because the filter and amplifier are superconductors through the use of cryogenic cooling.

The system designed by the inventor eliminates the need to use a cryogenic cooler. By eliminating the cryogenic cooler, the inventor has reduced cost, opened the supply chain to more competition and invented a more reliable system.

Cascade amplifiers may achieve a total gain through the gain of amplifier stages. Each amplifier stage provides a signal gain and the total amplifier gain is a function of the cumulative gains of the respective stages.

Low noise amplifiers (LNA) may be used to boost a desired signal power while adding as little noise and distortion as possible so that the retrieval of this signal is possible in a later stage of a system. Each stage of a cascade amplifier may consist of one or more LNA's.

Cascade filters may achieve a total signal rejection through the filter characteristics of filter stages. Each filter stage provides a signal rejection and the total filter rejection is a function of the cumulative rejection of the respective stages.

A band-pass filter is a device that passes frequencies within a certain range and rejects (attenuates) frequencies outside that range. In a Band Pass Filter circuit, the overall width of the actual passband between the upper and lower −3 dB corner points of the filter determines the Quality Factor or Q of the circuit. This Q Factor is a measure of how "Selective" or "Un-selective" the band pass filter is towards a given spread of frequencies. The lower the value of the Q factor the wider is the bandwidth of the filter and consequently the higher the Q factor the narrower and more "selective" is the filter.

Each stage of a cascade filter may consist of one or more band-pass filters having the same or varying Q factors. The selectivity of the cascade filter is a function of the Q factor of each filter stage.

A cascade system may consist of one or more cascade amplifiers and one or more cascade filters. The one or more cascade amplifiers may be a LNA. The one or more cascade filters may be a band-pass filter.

Example embodiments of an interference mitigation block are advantageously disclosed below using the cascade systems described above. By using the above described cascade systems, desired performance characteristics of the interference mitigation block may be achieved without the use of cryogenic cooling.

Figure 3:
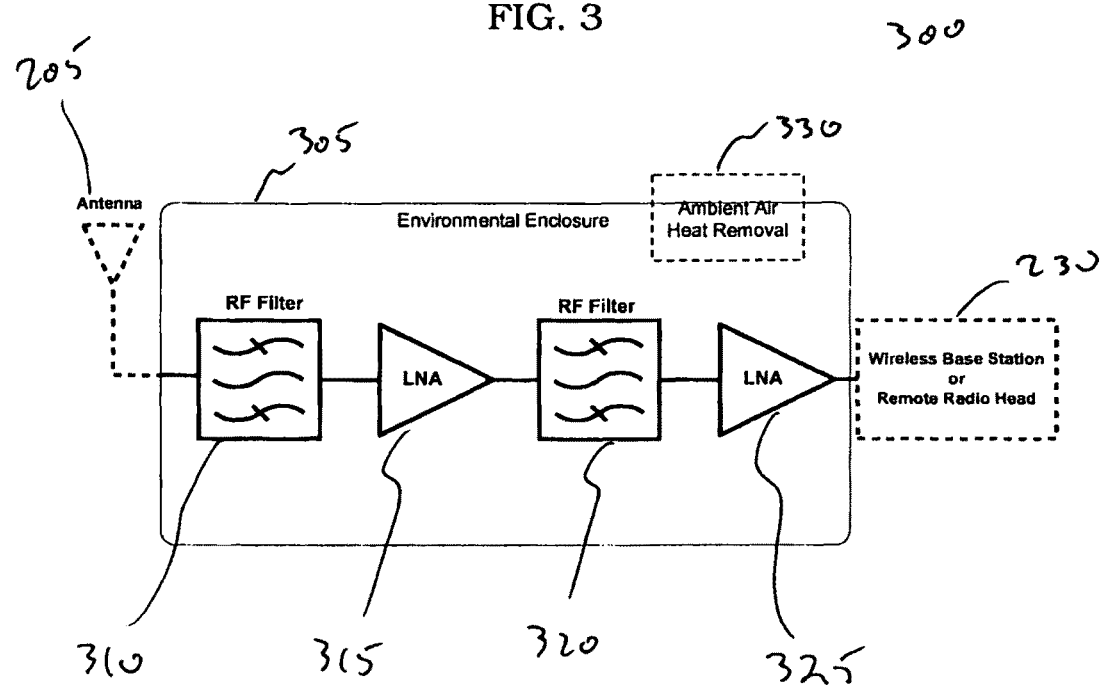
FIG. 3 illustrates an interference mitigation block according to example embodiments.

According to an embodiment, a 40 dB rejection can be achieved by, for example, dividing the rejection requirement equally between two filters, as illustrated in FIG. 3. This may result in easier filter requirements, therefore traditional medium Q-factor resonators may be used. The low noise amplifier (LNA) may be selected so that it can amplify the signal, and remain in a linear region of operation (High IP3 requirement) in the presence of interference that passes through the first filter. Various rejection split options and Low Noise Amplifier choices are possible. Because traditional filter components and LNA may be used in this design, no cryogenic cooler is needed.

FIG. 3 illustrates an interference mitigation block 300 according to example embodiments. As shown in FIG. 3, the interference mitigation block 300 includes an environmental enclosure 305, a first RF filter 310, a first low noise amplifier 315, a second RF filter 320 and a second low noise amplifier 325.

The environmental enclosure 305 provides no temperature control. The environmental enclosure 305 may provide protection from the elements for the components enclosed in the environmental enclosure 305. The environmental enclosure 305 may optionally include some form of ambient air heat removal system 330. The ambient air heat removal system 330 may be an active system (e.g., a fan). The ambient air heat removal system 330 may be an passive system (e.g., vents).

The first filter 310 may receive a signal from antenna 205 and selectively pass frequencies in the pass band of the interference mitigation block 300. The pass band may be 698.3 MHz-715.7 MHz. The first filter 310 may have parameters as shown below in Table 2 in order for the interference mitigation block 300 to achieve the performance characteristics as shown above in Table 1.

TABLE 2

| Parameter | Specification |
| --- | --- |
| Number of Resonators | 10 |
| Q-Factor | 20,000 |
| RX Pass band insertion loss Max | −0.55 |
| Rejection on Low side | 20 dB |
| Rejection on High side | 20 dB |
| Pass Band | 698.3 MHz-715.7 MHz |

The first low noise amplifier 315 may receive the filtered signal from the first filter 310 and amplify the signal. The first low noise amplifier 315 may be selected such that it can amplify the signal, and remain in the linear region of operation (e.g., a high IP3 requirement). The first low noise amplifier 315 may have parameters as shown below in Table 3 in order for the interference mitigation block 300 to achieve the performance characteristics as shown above in Table 1.

TABLE 3

| Parameter | Specification |
| --- | --- |
| IP3 | 34 dBm |
| NF | 0.6 dB |
| Gain | 17 dB |

The second filter 320 may receive the amplified signal from the first low noise amplifier 315 and selectively pass frequencies in the pass band of the interference mitigation block 300. The pass band may be 698.3 MHz-715.7 MHz. The second filter 320 may have parameters as shown below in Table 4 in order for the interference mitigation block 300 to achieve the performance characteristics as shown above in Table 1.

TABLE 4

| Parameter | Specification |
| --- | --- |
| Number of Resonators | 10 |
| Q-Factor | 5,000 |
| RX Pass band insertion loss Max | −2.0 |
| Refection on Low side | 20 dB |
| Pass Band | 698.3 MHz-715.7 MHz |

The second low noise amplifier 325 may receive the filtered signal from the second filter 320 and amplify the signal. The second low noise amplifier 325 may be selected such that it can amplify the signal, and remain in the linear region of operation (e.g., a high IP3 requirement). The low second noise amplifier 325 may have parameters as shown below in Table 5 in order for the interference mitigation block 300 to achieve the performance characteristics as shown above in Table 1.

TABLE 5

| Parameter | Specification |
| --- | --- |
| IP3 | 34 dBm |
| NF | 0.6 dB |
| Gain | 17 dB |

The interference mitigation block of FIG. 3 may be a component of, for example, a receiver front end. The receiver front end may be a component of, for example, a remote radio head (RRH), a tower mount amplifier (TMA), a ground mount amplifier (GMA), and/or a base station. Typically, the interference block is placed as close as is possible to the receive antenna (e.g., antennas 120, 125, 130 and 205) so as to limit the effect of transmission lines communicating a signal received by the antenna to the interference mitigation block.

A remote radio head RRH may be a component of a base transceiver station (BTS). The use of a RRH may allow the BTS to use several Micro-Cells to replace a Macro-Cell based on the conventional BTS. Therefore, an RRH may be better adapted to various wireless environments and enhance wireless performance, for example, system capacity and coverage.

The above described new interference mitigation block using conventional technology achieves an unexpected, unpredicted result and further satisfies a long felt need. One skilled in the art would not expect using the above described interference mitigation block to achieve performance characteristics comparable to an interference mitigation block using cryogenically cooled filters and amplifiers. As discussed above, the performance characteristics of the prior art is achieved because the filter and amplifier are superconductors through the use of cryogenic cooling.

The above described system, developed by the inventor, eliminates the need to use a cryogenic cooler. By eliminating the cryogenic cooler, the inventor has developed an interference mitigation block for which cost is reduced, the supply chain is opened to more competition and the interference mitigation block is more reliable as compared to a cryogenically cooled interference mitigation block.

While example embodiments have been particularly shown and described, it will be understood by one of ordinary skill in the art that variations in form and detail may be made therein without departing from the spirit and scope of the claims.

I claim:
1. A remote radio head receiver, comprising:
an antenna configured to receive a signal; and
an interference mitigation block configured to selectively pass and amplify the signal, the interference mitigation block including,
a plurality of filters connected in a cascade such that the plurality of filters are progressively more selective by having a lower quality factor and a higher pass band insertion loss than a preceding one of the plurality filters, and
a plurality of amplifiers connected between each of the plurality of filters, each of the plurality of amplifiers configured to remain in a linear region of operation while passing in the signal irrespective of any interference passing through to a preceding one of the plurality of filters, and the interference mitigation block not including a liquefied gas cooling system, wherein
the interference mitigation block is configured to selectively pass signals associated with frequencies between 698.3 MHz and 715.7 MHz and reject signals with fre- quencies below 698.3 MHz and above 715.7 MHz by passing the signal through the cascade.

2. The remote radio head receiver of claim 1, wherein the plurality of filters includes,
   a first filter configured to pass signals with frequencies between 698.3 MHz and 715.7 MHz, rejects signals with frequencies below 698.3 MHz and reject signals with frequencies above 715.7 MHz, and
   a second filter configured to pass signals with frequencies between 698.3 MHz and 715.7 MHz, reject signals with frequencies below 698.3 MHz and reject signals with frequencies above 715.7 MHz.

3. The remote radio head receiver of claim 2, wherein the first filter and the second filter are band pass filters,
   the first filter has a higher quality factor than the second filter, and
   the second filter has a higher pass band insertion loss than the first filter.

4. The remote radio head receiver of claim 1, wherein the plurality of amplifiers includes,
   a first amplifier and a second amplifier that are low noise amplifiers having high third order intermodulation characteristics.

5. The remote radio head receiver of claim 1, wherein the interference mitigation block is associated with one of a tower mount amplifier and a ground mount amplifier.

6. The remote radio head receiver of claim 1, wherein the liquefied gas cooling system is a cryogenic cooling system.

7. A remote radio head receiver, comprising:
   an antenna configured to receive a signal; and
   an interference mitigation block configured to selectively pass and amplify the signal, the interference mitigation block including,
      a plurality of filters connected in a cascade such that the plurality of filters are progressively more selective by having a lower quality factor and a higher pass band insertion loss than a preceding one of the plurality filters,
      a plurality of amplifiers connected between each of the plurality of filters, each of the plurality of amplifiers configured to remain in a linear region of operation while passing in the signal irrespective of any interference passing through to a preceding one of the plurality of filters, and
      a cooling system using ambient temperature air to dissipate heat generated by the interference mitigation block, wherein
         the interference mitigation block is configured to pass signals associated with frequencies between 698.3 MHz and 715.7 MHz and reject signals with frequencies below 698.3 MHz and above 715.7 MHz by passing the signal through the cascade.

8. The remote radio head receiver of claim 7, wherein the plurality of filters includes,
   a first filter configured to pass signals with frequencies between 698.3 MHz and 715.7 MHz, rejects signals with frequencies below 698.3 MHz and rejects signals with frequencies above 715.7 MHz, and
   a second filter configured to pass signals with frequencies between 698.3 MHz and 715.7 MHz, rejects signals with frequencies below 698.3 MHz and rejects signals with frequencies above 715.7 MHz.

9. The remote radio head receiver of claim 8, wherein the first filter and the second filter are band pass filters,
   the first filter has a higher quality factor than the second filter, and
   the second filter has a higher pass band insertion loss than the first filter.

10. The remote radio head receiver of claim 7, wherein the plurality of amplifiers includes,
    a first amplifier and a second amplifier that are low noise amplifiers having high third order intermodulation characteristics.

11. The remote radio head receiver of claim 7, wherein the interference mitigation block is associated with one of a tower mount amplifier and a ground mount amplifier.

12. A distributed base station, comprising:
    an antenna configured to receive a signal;
    a remote radio head receiver including an interference mitigation block configured to selectively pass and amplify the signal, the interference mitigation block including,
       a plurality of filters connected in a cascade such that the plurality of filters are progressively more selective by having a lower quality factor and a higher pass band insertion loss than a preceding one of the plurality filters, and
       a plurality of amplifiers connected between each of the plurality of filters, each of the plurality of amplifiers configured to remain in a linear region of operation while passing in the signal irrespective of any interference passing through to a preceding one of the plurality of filters; and
    a base station server configured to interconnect the remote radio head with a network, wherein
       the interference mitigation block is configured to pass signals associated with frequencies between 698.3 MHz and 715.7 MHz and reject signals with frequencies below 698.3 MHz and above 715.7 MHz by passing the signal through the cascade.

13. The distributed base station of claim 12, wherein the plurality of filters includes,
    a first filter configured to pass signals with frequencies between 698.3 MHz and 715.7 MHz, rejects signals with frequencies below 698.3 MHz and rejects signals with frequencies above 715.7 MHz, and
    a second filter configured to pass signals with frequencies between 698.3 MHz and 715.7 MHz, rejects signals with frequencies below 698.3 MHz and rejects signals with frequencies above 715.7 MHz.

14. The distributed base station of claim 13, wherein the first filter and the second filter are band pass filters,
    the first filter has a higher quality factor than the second filter, and
    the second filter has a higher pass band insertion loss than the first filter.

15. The distributed base station of claim 12, wherein the plurality of amplifiers includes,
    a first amplifier and a second amplifier that are low noise amplifiers having high third order intermodulation characteristics.

* * * * *